(12) United States Patent
Taniguchi

(10) Patent No.: US 11,171,689 B2
(45) Date of Patent: Nov. 9, 2021

(54) WIRELESS POWER DEVICE WITH INTERFERENCE MITIGATION

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 16/808,189

(22) Filed: Mar. 3, 2020

(65) Prior Publication Data

US 2021/0067200 A1 Mar. 4, 2021

(30) Foreign Application Priority Data

Aug. 28, 2019 (JP) .............. JP2019-155781

(51) Int. Cl.
*H02J 50/80* (2016.01)
*H04B 5/00* (2006.01)
*H02J 50/10* (2016.01)
*H04W 52/24* (2009.01)
*H02J 50/20* (2016.01)

(52) U.S. Cl.
CPC ............ *H04B 5/0037* (2013.01); *H02J 50/10* (2016.02); *H02J 50/20* (2016.02); *H02J 50/80* (2016.02); *H04W 52/243* (2013.01)

(58) Field of Classification Search
CPC . H02J 50/10; H02J 50/20; H02J 50/80; H04B 5/0037; H04W 52/243
USPC .................................................. 307/104
See application file for complete search history.

(56) References Cited

U.S. PATENT DOCUMENTS

| 2010/0151808 A1* | 6/2010 | Toncich | H02J 50/20 455/226.3 |
| 2012/0280574 A1 | 11/2012 | Hur et al. | |
| 2012/0309308 A1* | 12/2012 | Kim | H02J 50/90 455/41.1 |
| 2012/0329403 A1* | 12/2012 | Muraoka | H04W 52/242 455/67.13 |

(Continued)

FOREIGN PATENT DOCUMENTS

| JP | 2016512677 A | 4/2016 |
| JP | 2020036519 | 3/2020 |

OTHER PUBLICATIONS

U.S. Appl. No. 16/299,102, filed Mar. 11, 2019, First Named Inventor: Kentaro Taniguchi, Title: Electronic Apparatus.

*Primary Examiner* — William Hernandez
(74) *Attorney, Agent, or Firm* — Holtz, Holtz & Volek PC

(57) ABSTRACT

According to one embodiment, an electronic device includes processor circuitry. The processor circuitry is configured to control detection module to execute a first carrier sense by performing at least one of phase control and amplitude control corresponding to a first beam pattern for a received wireless signal, and execute a second carrier sense by performing at least one of phase control and amplitude control corresponding to a second beam pattern for the received wireless signal, and supply power by an electromagnetic wave with the first beam pattern based on a result of the first carrier sense, and control power supply module to supply power by an electromagnetic wave with the second beam pattern based on a result of the second carrier sense.

13 Claims, 9 Drawing Sheets

(56) References Cited

U.S. PATENT DOCUMENTS

| | | | |
|---|---|---|---|
| 2013/0154387 A1* | 6/2013 | Lee | H02J 7/00034 |
| | | | 307/104 |
| 2014/0217967 A1 | 8/2014 | Zeine et al. | |
| 2015/0042526 A1 | 2/2015 | Zeine | |
| 2015/0208364 A1* | 7/2015 | Fukuhara | H04W 52/28 |
| | | | 455/522 |
| 2019/0068003 A1* | 2/2019 | Falkenburg | H02J 50/12 |
| 2019/0131827 A1* | 5/2019 | Johnston | H02J 7/0071 |
| 2019/0391620 A1* | 12/2019 | Matsuo | H02J 50/40 |
| 2020/0076239 A1 | 3/2020 | Taniguchi et al. | |
| 2020/0185966 A1* | 6/2020 | Asanuma | H02J 50/12 |
| 2020/0185975 A1* | 6/2020 | Taniguchi | H02P 29/40 |
| 2021/0067199 A1* | 3/2021 | Taniguchi | H02J 50/10 |

* cited by examiner

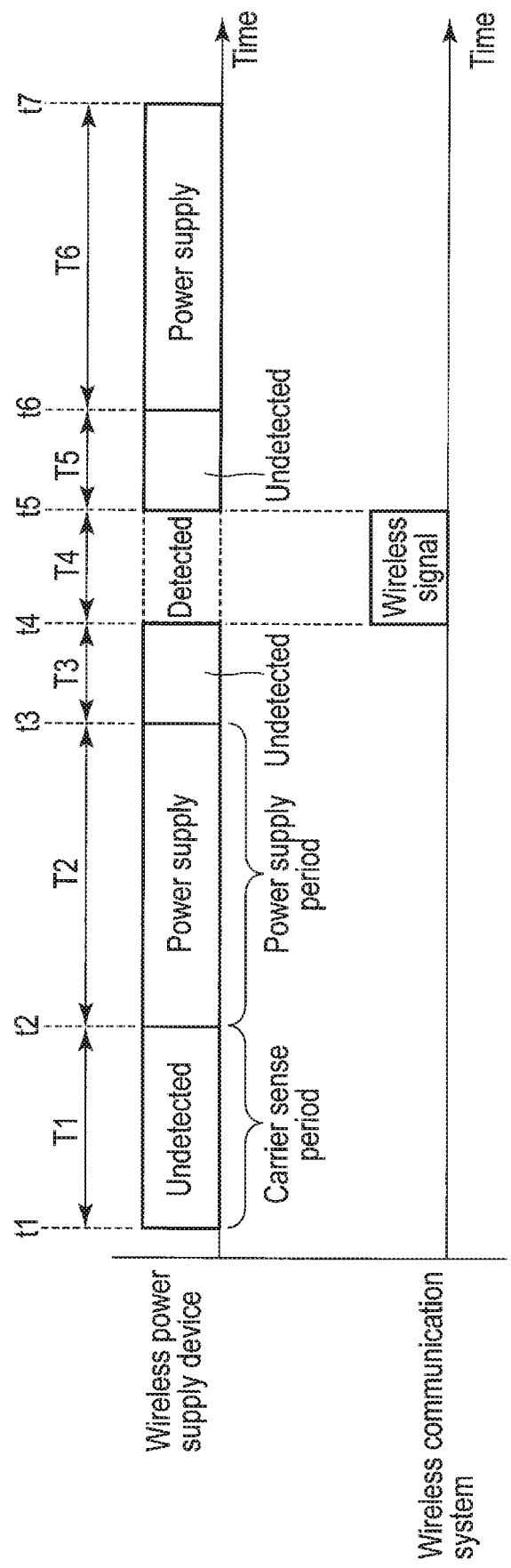
F I G. 6

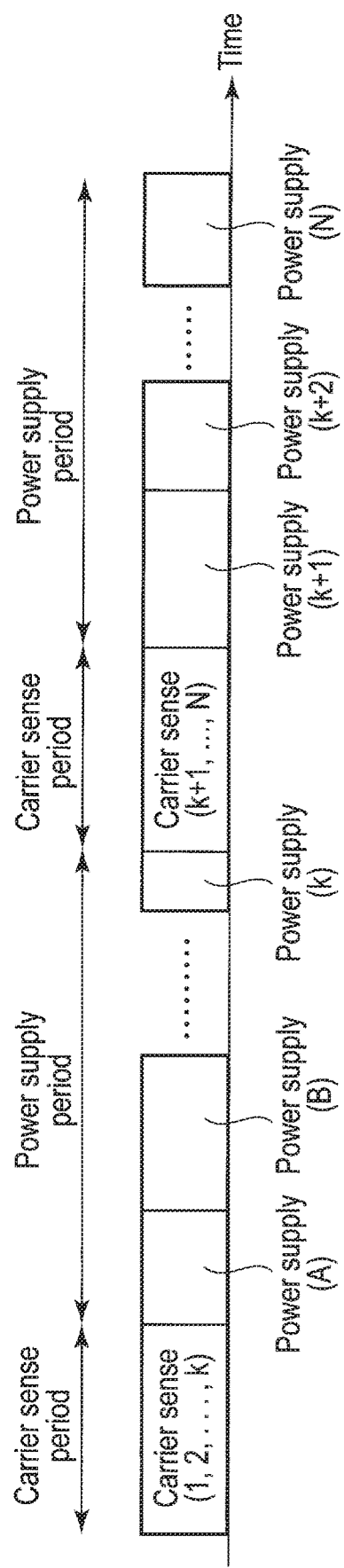
F I G. 18

WIRELESS POWER DEVICE WITH INTERFERENCE MITIGATION

CROSS-REFERENCE TO RELATED APPLICATIONS

This application is based upon and claims the benefit of priority from Japanese Patent Application No. 2019-155781, filed Aug. 28, 2019, the entire contents of which are incorporated herein by reference.

FIELD

Embodiments described herein relate generally to an electronic device.

BACKGROUND

Recently, attention has been focused on a technology of enabling power transmission to a power reception device (in other words, power supply to a power reception device) by transmitting an electromagnetic wave (for example, a microwave) for power supply from an electronic device called a wireless power supply device.

This technology releases us from the physical restrictions applied when power is supplied to an electronic device via a cable in the conventional art. Thus, the considerable improvement of convenience is expected.

To effectively supply power to a power reception device, a wireless power supply device needs to transmit an electromagnetic wave having a high power level.

However, if a wireless power supply device transmits an electromagnetic wave having a high power level, the electromagnetic wave may interfere with an existing wireless communication system.

In some cases, a wireless power supply device transmits power to a plurality of power reception devices. In these cases, it is difficult to effectively supply power to the power reception devices while suppressing the above-described interference with an existing wireless communication system.

BRIEF DESCRIPTION OF THE DRAWINGS

FIG. 6 is shown for explaining the outline of the operation of the wireless power supply device.

FIG. 18 is shown for explaining an example of the operation of the wireless power supply device when N is greater than k.

DETAILED DESCRIPTION

In general, according to one embodiment, an electronic device includes processor circuitry. The processor circuitry is configured to control detection module to execute a first carrier sense by performing at least one of phase control and amplitude control corresponding to a first beam pattern for a received wireless signal, and execute a second carrier sense by performing at least one of phase control and amplitude control corresponding to a second beam pattern for the received wireless signal, and control power supply module to supply power by an electromagnetic wave with the first beam pattern based on a result of the first carrier sense, and supply power by an electromagnetic wave with the second beam pattern based on a result of the second carrier sense.

Various embodiments will be described hereinafter with reference to the accompanying drawings.

First Embodiment

A first embodiment is explained. In the present embodiment, a wireless power supply system includes an electronic device (hereinafter, referred to as a wireless power supply device) which has a function of transmitting (supplying) power by an electromagnetic wave, and an electronic device (hereinafter, referred to as a power reception device) which receives power transmitted from the wireless power supply device.

The wireless power supply device transmits power to a power reception device by an electromagnetic wave with a specific frequency band. In this case, the electromagnetic wave may interfere with an existing wireless communication system using the same or a near frequency band. For this reason, the wireless power supply device includes a structure for suppressing interference with an existing wireless communication system.

A wireless communication system includes wireless communication devices including, for example, a base station and a terminal device performing wireless communication.

Figure 1:
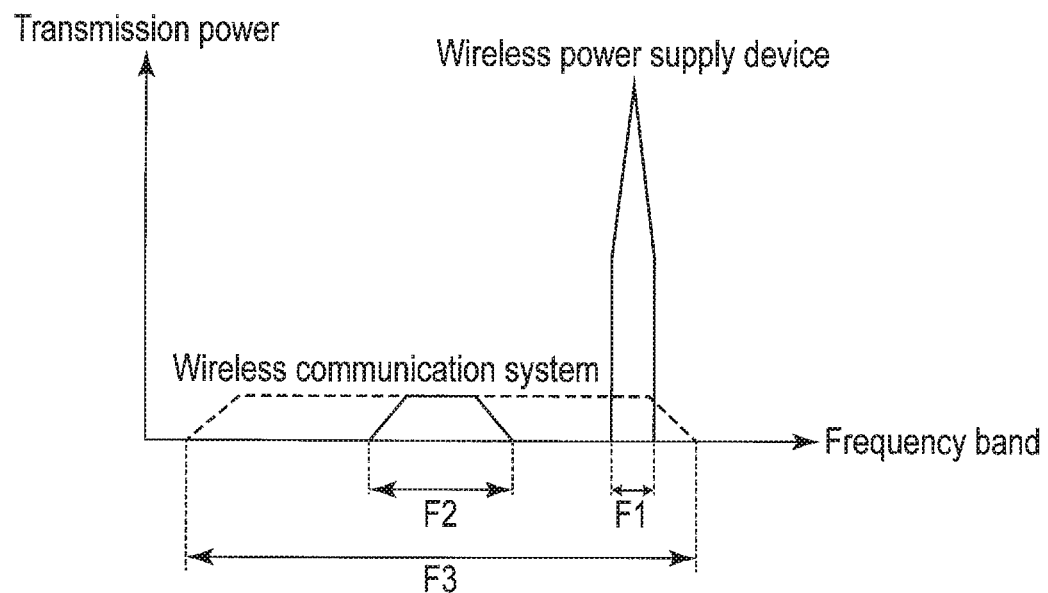
FIG. 1 is shown for explaining the relationship between a wireless power supply device and an existing wireless communication system according to a first embodiment.

Now, this specification explains the relationship between the wireless power supply device and an existing wireless communication system with reference to FIG. 1. As described above, the wireless power supply device is configured to transmit power to a power reception device by an electromagnetic wave. It is assumed that the wireless power supply device transmits power, using, for example, frequency band F1. It is assumed that the wireless communication system performs wireless communication, using, for example, frequency band F2.

In FIG. 1, the vertical axis shows transmission power. The power level of the electromagnetic wave which is transmitted from the wireless power supply device when power is transmitted is much higher than, for example, the power level of the wireless signal transmitted in the wireless communication system.

In FIG. 1, the horizontal axis shows a frequency band. When the difference in the frequency between frequency band F1 used by the wireless power supply device and frequency band F2 used by the wireless communication system is small (in other words, when the wireless communication system uses frequency band F2 near frequency band F1 used by the wireless power supply device), the power supply (power transmission) by the wireless power supply device may interfere with the wireless communication system.

Further, in many cases, a wireless communication terminal included in the wireless communication system includes an antenna configured to receive the wireless signal of frequency band F3 broader than frequency band F2 used by the wireless communication system. Therefore, the possibility that the wireless communication system is affected by the wireless power supply device is increased.

For this reason, power should be supplied by the wireless power supply device in consideration of the usage situation of near frequency bands in addition to frequency band F1 used by the wireless power supply device.

In the present embodiment, before the wireless power supply device supplies power, the wireless power supply device at least scans the frequency band used by the wireless power supply device or a near frequency band and executes a carrier sense at the frequency band. In this way, the wireless power supply device examines whether or not a wireless communication system using the frequency band is present.

In the present embodiment, the term "carrier sense" indicates, for example, the detection of the presence or absence of a wireless signal transmitted in a wireless communication system (in other words, the examination of whether or not a wireless signal is detected). The detection of a wireless signal may indicate that a wireless signal is temporarily detected, or that a wireless signal is continuously detected in a predetermined period. The term "carrier sense" may encompass the concept of analyzing (demodulating or decrypting) a part of or all of a wireless signal.

Figure 2:
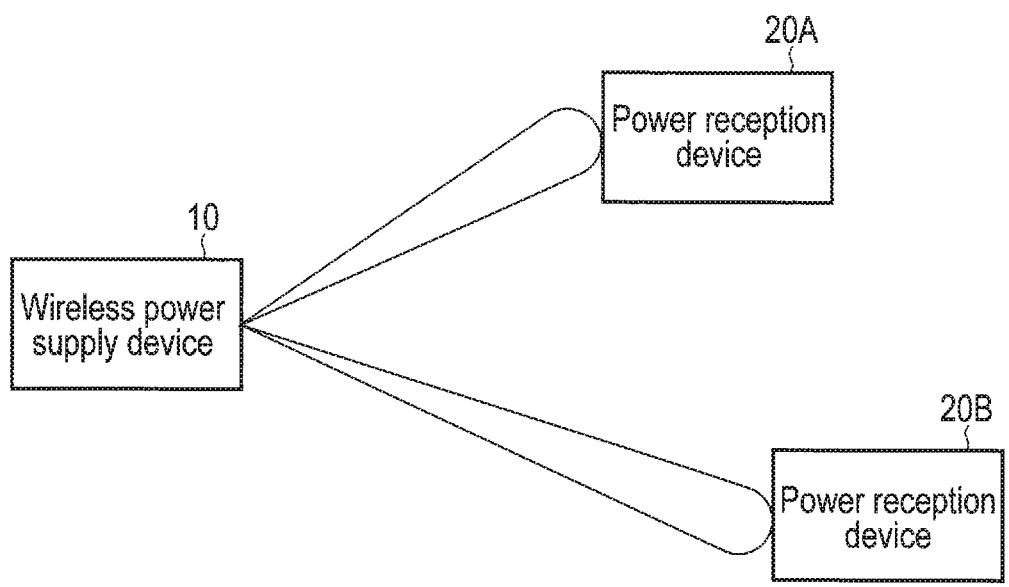
FIG. 2 is shown for explaining the correspondence relationship between the wireless power supply device and power reception devices.

Now, this specification explains the correspondence relationship between the wireless power supply device and power reception devices according to the present embodiment with reference to FIG. 2.

In the present embodiment, as shown in FIG. 2, it is assumed that the wireless power supply device 10 transmits (supplies) power to a plurality of power reception devices. In the example of FIG. 2, the power reception devices include power reception devices 20A and 20B.

In this case, the wireless power supply device 10 forms a beam (hereinafter, referred to as a power supply beam) of an electromagnetic wave with a beam pattern corresponding to power reception device 20A, and transmits power to power reception device 20A. Similarly, the wireless power supply device 10 forms a power supply beam with a beam pattern corresponding to power reception device 20B, and transmits power to power reception device 20B.

Figure 3:
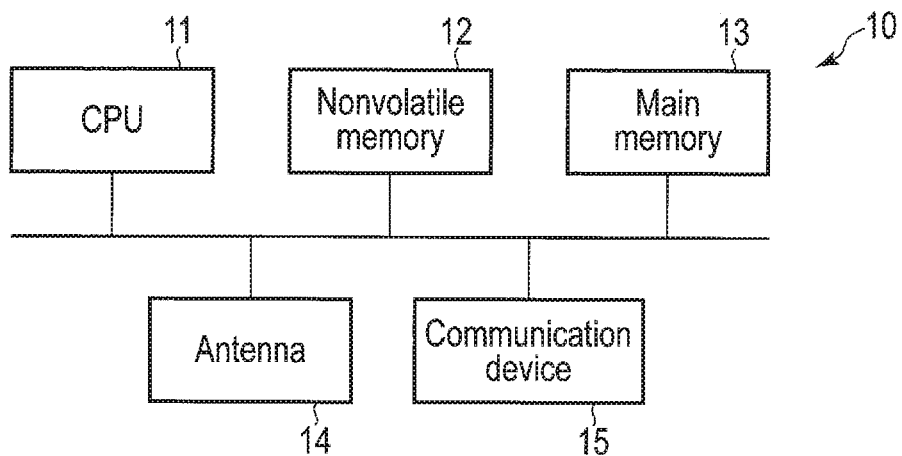
FIG. 3 shows an example of the hardware configuration of the wireless power supply device.

Now, this specification explains the configurations of the wireless power supply device 10 and power reception devices 20A and 20B according to the present embodiment. FIG. 3 shows an example of the hardware configuration of the wireless power supply device 10. As shown in FIG. 3, the wireless power supply device 10 includes a CPU 11, a nonvolatile memory 12, a main memory 13, an antenna 14, a communication device 15, etc.

The CPU 11 is a hardware processor (processor circuitry) which controls the operation of each component of the wireless power supply device 10. The CPU 11 executes a program loaded from the nonvolatile memory 12 which is a storage device into the main memory 13.

The antenna 14 includes, for example, a phased array antenna including a plurality of antenna elements. Each antenna element of the phased array antenna is excited by adjusting at least one of the phase and the amplitude. In this way, the phased array antenna is configured to form the above power supply beams (specifically, beam patterns). The phased array antenna is also configured to receive a wireless signal transmitted in the above wireless communication system.

The communication device 15 is a device configured to, for example, perform wireless communication with an external device.

Figure 4:
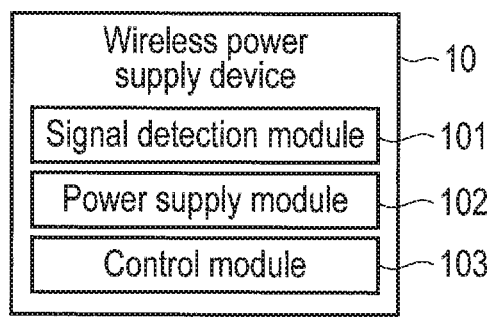
FIG. 4 is a block diagram showing an example of the functional configuration of the wireless power supply device.

FIG. 4 is a block diagram showing an example of the functional configuration of the wireless power supply device 10. As shown in FIG. 4, the wireless power supply device 10 includes a signal detection module 101, a power supply module 102 and a control module 103.

In the present embodiment, a part or all of the signal detection module 101, the power supply module 102 and the control module 103 may be implemented (controlled) by causing the CPU 11 to execute a program, in other words, by software, or may be implemented by hardware such as an integrated circuit (IC), or may be implemented as a structure of a combination between software and hardware.

The signal detection module 101 is a functional module which executes the above carrier sense. Specifically, a wireless signal transmitted in a wireless communication system (in other words, the wireless signal of the wireless communication system) can be received via the antenna 14. The signal detection module 101 detects the power level (signal energy) of the received wireless signal. In this way, the signal detection module 101 detects the presence or absence of a wireless signal.

The power supply module 102 is a functional module which supplies power to reception devices 20A and 20B (in other words, which transmits power by power supply beams) based on the result of detection by the signal detection module 101 (in other words, the result of carrier sense). When a wireless signal is detected by the signal detection module 101, the power supply module 102 does not supply power to avoid interference with a wireless communication system. When no wireless signal is detected by the signal detection module 101, the power supply module 102 supplies power.

The control module 103 receives information transmitted from power reception device 20A and related to power reception device 20A (hereinafter, referred to as the power reception device information of power reception device 20A). The control module 103 receives information transmitted from power reception device 20B and related to power reception device 20B (hereinafter, referred to as the power reception device information of power reception device 20B). The power reception device information of power reception device 20A includes, for example, a power reception device ID allocated to power reception device 20A, and a power amount (request power reception amount) necessary for power reception device 20A. Similarly, the power reception device information of power reception device 20B includes, for example, a power reception device ID allocated to power reception device 20B, and a power amount (request power reception amount) necessary for power reception device 20B. The power reception device information of power reception devices 20A and 20B should be preferably received by wireless communication using a frequency band different from the frequency band used to supply power (in other words, a frequency band different from the power supply beams).

The control module 103 receives a beacon signal transmitted from power reception devices 20A and 20B via the antenna 14 apart from the power reception device information of power reception devices 20A and 20B. In the present embodiment, the beacon signal is used to estimate the propagation channel for supplying power. Thus, the beacon signal is received using the same frequency band as the power supply beams, or a frequency band near the power supply beams.

The present embodiment requires an antenna (wireless power supply antenna) for supplying power, an antenna (wireless communication antenna) for receiving the power reception device information of power reception devices 20A and 20B) and an antenna (beacon signal reception antenna) for receiving a beacon signal. The antenna 14 may either separately include these antennas or include a single antenna which can be used as these antennas. Alternatively, for example, the above phased array antenna may be used as an antenna for supplying power and an antenna for receiving a beacon signal. Separately from the phased array antenna, an antenna for receiving the power reception device information of power reception devices 20A and 20B may be provided.

When a beacon signal is received via the phased array antenna, the control module 103 computes the phase information or the amplitude information of the signal received by each antenna element of the phased array antenna. In the wireless power supply device 10, a power supply beam can be formed by exciting each antenna element of the phased array antenna based on the computed phase information or amplitude information. Specifically, for example, a power supply beam corresponding to power reception device 20A can be formed based on the phase information or amplitude information computed by receiving a beacon signal transmitted from power reception device 20A. Similarly, for example, a power supply beam corresponding to power reception device 20B can be formed based on the phase information or amplitude information computed by receiving a beacon signal transmitted from power reception device 20B. In the following explanation, the phase information or amplitude information for exciting each antenna element as described above is called the weight of each antenna. The weight may be at least one of phase information and amplitude information.

Here, a beacon signal is used to compute a weight. However, for example, when the locations (directions) of power reception devices 20A and 20B are known in advance, a fixed weight (information) corresponding to each of the locations of power reception devices 20A and 20B may be managed in the wireless power supply device 10 in advance.

Figure 5:
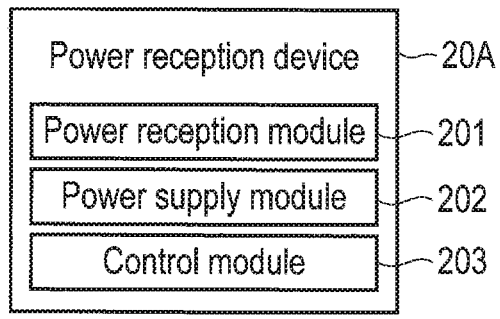
FIG. 5 shows an example of the functional configuration of a power reception device.

FIG. 5 is a block diagram showing an example of the functional configuration of power reception device 20A. As shown in FIG. 5, power reception device 20A includes a power reception module 201, a power supply module 202 and a control module 203.

As described above, power reception device 20A includes an antenna configured to receive an electromagnetic wave (power supply beam) transmitted from the wireless power supply device 10. The power reception module 201 receives power transmitted by the electromagnetic wave received via the antenna.

The power supply module 202 supplies the power received by the power reception module 201 to each component of power reception device 20A. Specifically, power reception device 20A includes a battery or capacitor (power storage unit) configured to store power. The power supply module 202 charges the power storage unit by supplying the power received by the power reception module 201 to the power storage unit.

The control module 203 performs, for example, a process for transmitting the power reception device information of power reception device 20A and a beacon signal as described above to the wireless power supply device 10.

In FIG. 5, the functional configuration of power reception device 20A is explained. The functional configuration of power reception device 20B is the same as that of power reception device 20A.

The detailed explanation of the hardware configuration of power reception devices 20A and 20B is omitted. However, power reception devices 20A and 20B should include, for example, a CPU, a nonvolatile memory, a main memory, a sensor, a camera and a communication device in addition to the above antenna and battery.

Now, this specification explains the outline of the operation of the wireless power supply device 10 with reference to FIG. 6. For the sake of convenience, here, this specification explains the basic operation performed when a single power reception device is provided.

For example, the signal detection module 101 starts a carrier sense at time t1. In this case, the period (hereinafter, referred to as a signal undetected period) in which no wireless signal is detected is counted. The signal detection module 101 finishes the carrier sense at time t2 when the counted signal undetected period T1 reaches a predetermined period (hereinafter, referred to as a carrier sense period). The carrier sense period is equivalent to a period for confirming that no wireless signal is detected to supply power.

When the carrier sense is finished at time t2, the power supply module 102 starts power supply (power transmission) at time t2. In this case, the period (hereinafter, referred to as a power transmission period) in which power is supplied by transmitting power is counted. The power supply module 102 finishes the power supply at time t3 when the counted power transmission period T2 reaches a predetermined period (hereinafter, referred to as a power supply period).

When the power supply is finished at time t3, the signal detection module 101 executes a carrier sense again at time t3.

As shown in FIG. 6, it is assumed that no wireless signal is detected in period T3 from time t3 to time t4, and a wireless signal is detected in period T4 from time t4 to time t5. In this case, the process for counting the signal undetected period from time t3 is stopped at time t4.

When a wireless signal is detected in period T4 from time t4 to time t5, and no wireless signal is detected from time t5 again, the stopped process for counting the signal undetected period is restarted at time t5. In this case, the carrier sense is finished at time t6 when the sum of signal undetected period T3 and signal undetected period T5 reaches the carrier sense period.

When the carrier sense is finished at time t6, the power supply module 102 supplies power in period T6 (power supply period) from time t6 to time t7.

As described above, the wireless power supply device 10 supplies power when no wireless signal is detected in a carrier sense period, thereby suppressing interference with an existing wireless communication system by the power supply.

Even if a wireless signal is detected during a carrier sense, when the sum of the above signal undetected periods reaches the carrier sense period, power is supplied. Although not shown in FIG. 6, when a wireless signal is continuously detected, and the signal undetected period does not reach the carrier sense period, power is not supplied. Even when a wireless signal is transmitted in a wireless communication system during power supply, the power supply is continued.

In the present embodiment, the above carrier sense period and power supply period are set in advance. The carrier sense period and the power supply period may be determined based on, for example, the specification of the wireless power supply system (the wireless power supply device 10 and power supply devices 20A and 20B) and the specification of a wireless communication system having a possibility of coexistence. For example, when the power level (transmission power) of the electromagnetic wave transmitted from the wireless power supply device 10 is high, and the distance from the wireless power supply device 10 to power reception devices 20A and 20B is short, sufficient power may be transmitted even in a short power supply period. Thus, a short power supply period is set. This configuration enables suppression of interference with a wireless communication system. When the power level (transmission power) of the electromagnetic wave transmitted from the wireless power supply device 10 is low, and the distance from the wireless power supply device 10 to power reception devices 20A and 20B is great, the efficiency of power supply needs to be increased by elongating the power supply period. Thus, a long power supply period is set.

When the packet length of a wireless communication system is standardized, the probability of detection of a wireless signal transmitted in the wireless communication system may be improved by setting the carrier sense period so as to be longer than or equal to a period necessary for receiving a wireless signal having the maximum packet length.

According to the above operation of the wireless power supply device 10 as shown in FIG. 6, the wireless power supply device 10 is allowed to coexist with an existing wireless communication system by executing carrier sense and power supply under the restrictions of a predetermined carrier sense period and a predetermined power supply period.

In FIG. 6, immediately after power supply is performed, the next carrier sense is executed. However, a certain period (waiting time) may be provided between the power supply and the carrier sense.

The present embodiment assumes that power is supplied to each of a plurality of power reception devices 20A and 20B. In this case, a carrier sense should be executed in consideration of the weight of each antenna.

A carrier sense is executed to avoid interference with a wireless communication system in the power supply allowable area to which energy is supplied (power is transmitted) by a predetermined power supply beam (specifically, a beam pattern) when power is supplied using the power supply beam.

Thus, the weight of an antenna (reception antenna) used when a carrier sense is executed (a signal detection is attempted) should be the same as the weight of an antenna (transmission antenna) used when power supply is performed after the carrier sense.

When the weight of the reception antenna (the antenna for receiving a wireless signal) used when a carrier sense is executed is the same as the weight of the transmission antenna (the antenna for transmitting an electromagnetic wave) used when the subsequent power supply is performed as described above, the wireless signal of a wireless communication system in an area which may be affected by a power supply beam can be appropriately detected. The beam pattern of a power supply beam has one to one relationship with the weight of an antenna.

When power is supplied to a plurality of power reception devices 20A and 20B by power supply beams having different beam patterns like the present embodiment, it is necessary to execute a carrier sense with a weight corresponding to each beam pattern and subsequently supply power with the same weight as the weight corresponding to the beam pattern. In the present embodiment, a carrier sense with a weight (at least one of phase information and amplitude information) corresponding to a beam pattern is equivalent to a carrier sense in a state where each antenna element of the phased array antenna is excited based on such a weight.

Figure 7:
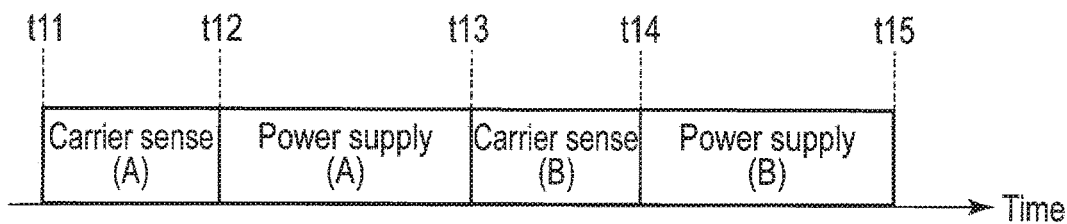
FIG. 7 is shown for explaining an example of the operation of the wireless power supply device when power is supplied to a plurality of power reception devices.

Now, this specification explains an example of the operation of the wireless power supply device 10 when power is supplied to each of power reception devices 20A and 20B with reference to FIG. 7. In the following explanation, the beam pattern of a power supply beam for supplying power to power reception device 20A is referred to as a first beam pattern, and the beam pattern of a power supply beam for supplying power to power reception device 20B is referred to as a second beam pattern.

To supply power to power reception device 20A, the signal detection module 101 starts carrier sense (A) with a weight corresponding to the first beam pattern at time t11.

When no wireless signal is detected in the above carrier sense period in carrier sense (A) started at time t11 (in other words, when the signal undetected period reaches the carrier sense period, and channel clear is confirmed), carrier sense (A) is finished at time t12.

When carrier sense (A) is finished at time t12, the power supply module 102 starts power supply (A) with the first beam pattern at time t12. In this case, power is supplied with the power supply beam formed by exciting the antenna of each element of the phased array antenna based on a weight corresponding to the first beam pattern.

When the above power supply period passed after the start of power supply (A) at time t12 (in other words, when the power transmission period reaches the power supply period), power supply (A) is finished at time t13 when the power supply period passed.

Subsequently, to supply power to power reception device 20B, the signal detection module 101 starts carrier sense (B) with a weight corresponding to the second beam pattern at time t13.

When no wireless signal is detected in the above carrier sense period in carrier sense (B) started at time t13, carrier sense (B) is finished at time t14.

When carrier sense (B) is finished at time t14, the power supply module 102 starts power supply (B) with the second beam pattern at time t14. In this case, power is supplied with the power supply beam formed by exciting the antenna of each element of the phased array antenna based on a weight corresponding to the second beam pattern.

When the above power supply period passed after the start of power supply (B) at time t14, power supply (B) is finished at time t15 when the power supply period passed.

When the wireless power supply device 10 operates as shown in FIG. 7, a carrier sense can be executed with a weight corresponding to each of the first and second beam patterns, and further, power can be appropriately supplied to each of power supply devices 20A and 20B based on the result of the carrier sense.

When power reception device information is received from power reception devices 20A and 20B as described above, the power supply period should be preferably adjusted based on the request power reception amount included in the power reception device information of each of power reception devices 20A and 20B.

Figure 8:
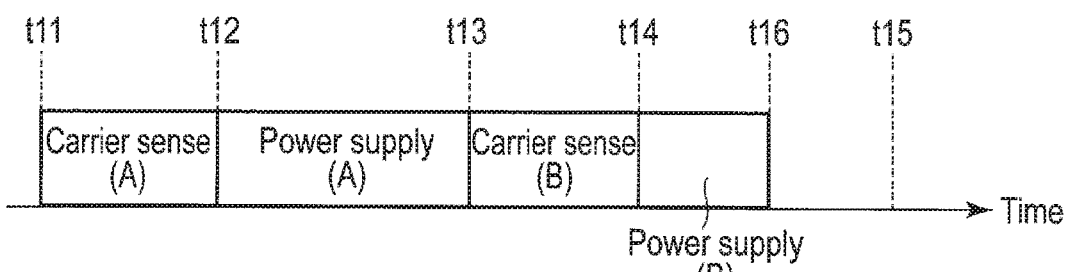
FIG. 8 shows an example of the operation of the wireless power supply device when a power supply period is adjusted based on request power reception amounts from a plurality of power reception devices.

FIG. 8 shows an example of the operation of the wireless power supply device 10 when the power supply period is adjusted based on the request power reception amount included in the power reception device information of each of power reception devices 20A and 20B (in other words, a request power reception amount from each of power reception devices 20A and 20B). The operation shown in FIG. 8 is explained as a comparison example for the present embodiment. In FIG. 8, the detailed explanation of the same portions as FIG. 7 is omitted. Portions different from FIG. 7 are mainly explained.

Here, for example, it is assumed that the ratio of a request power reception amount from power reception device 20A (the request power reception amount included in the power reception device information of power reception device 20A) to a request power reception amount from power reception device 20B (the request power reception amount included in the power reception device information of power reception device 20B) is two to one.

In this case, as shown in FIG. 8, the period for performing power supply (A) is the period from time t12 to time t13 whereas the period for performing power supply (B) is the period from time t14 to time t16 and is half the period of power supply (A).

In this configuration, the ratio of the power supply period of power supply (A) to the power supply period of power supply (B) is also two to one based on the ratio (2:1) of the request power reception amount from power reception device 20A to the request power reception amount from power reception device 20B. Thus, power can be supplied based on the requests from power reception devices 20A and 20B.

However, as described above, predetermined periods are assured as the carrier sense period and the power supply period. Therefore, when the wireless power supply device 10 operates as shown in FIG. 8, power is not supplied in the period from time t16 to time t15. Thus, the efficiency of power supply is decreased.

In the present embodiment, the signal detection module 101 includes a digital circuit, and collectively executes carrier senses with weights corresponding to different beam patterns by the digital circuit.

Figure 9:
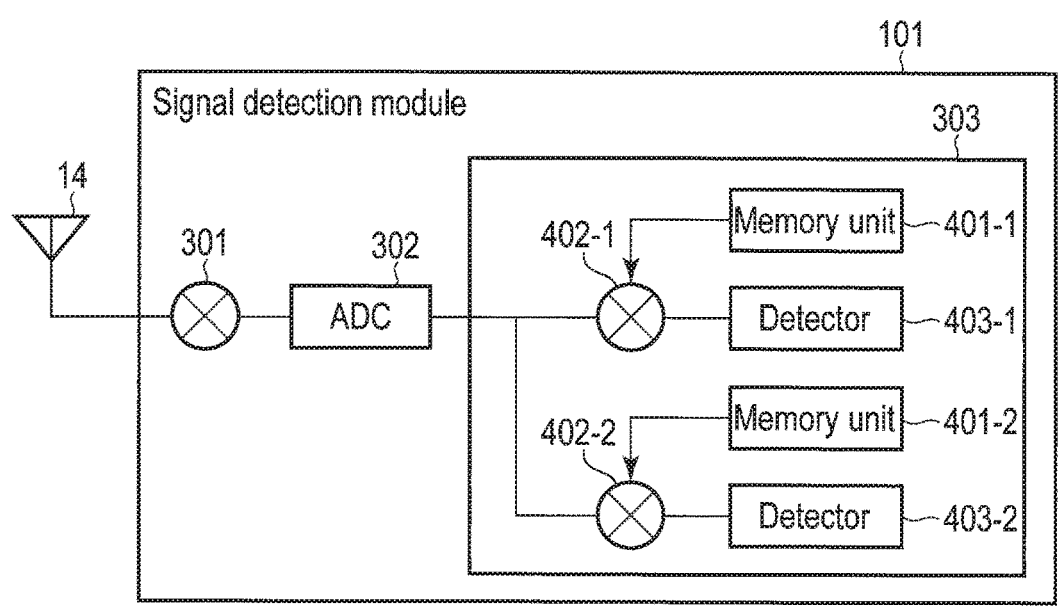
FIG. 9 shows an example of the configuration of a signal detection module.

FIG. 9 shows an example of the configuration of the signal detection module 101. As shown in FIG. 9, the signal detection module 101 includes a mixer 301, an analog-to-digital converter (ADC) 302 and a digital circuit 303.

When a carrier sense is executed in the present embodiment, it is assumed that the antenna 14 excites each antenna element of the phased array antenna so as to receive wireless signals in a broad range at least including the wireless signals to be detected in the above carrier senses (A) and (B).

When a wireless signal is received in the antenna 14, the mixer 301 down-converts the wireless signal into a base band signal or an intermediate frequency signal. One or more amplifiers or filters may be further provided in the stage before or after the mixer 301 although the illustration is omitted in FIG. 9.

The analog-to-digital converter 302 converts the base band signal (analog signal) into a digital signal and outputs it to the digital circuit 303.

The digital circuit 303 is configured to apply, to the digital signal (hereinafter, referred to as the input signal) output from the analog-to-digital converter 302, a carrier sense by performing at least one of phase control and amplitude control corresponding to the first beam pattern in parallel with a carrier sense by performing at least one of phase control and amplitude control corresponding to the second beam pattern.

Specifically, the digital circuit 303 includes memory units 401-1 and 401-2, multipliers 402-1 and 402-2, and detectors 403-1 and 403-2.

A weight (at least one of phase information and amplitude information) corresponding to the first beam pattern is retained in memory unit 401-1. Weight information other than a weight corresponding to the first beam pattern may be retained in memory unit 401-1. The weight retained in memory unit 401-1 may be updated as needed.

Multiplier 402-1 performs a weight multiplication process using the weight corresponding to the first beam pattern and retained in memory unit 401-1. Multiplier 402-1 multiplies an input signal for the digital circuit 303 by a weight corresponding to the first beam pattern. In this configuration, multiplier 402-1 is allowed to obtain a signal equivalent to a wireless signal which is detected when a carrier sense is executed with a weight corresponding to the first beam pattern.

Detector 403-1 detects (determines) the presence or absence of a wireless signal based on the signal obtained by multiplier 402-1 (in other words, the signal obtained by weight multiplication). Specifically, for example, detector 403-1 detects a wireless signal (in other words, determines the state as channel busy) when the energy of the signal obtained by weight multiplication is greater than or equal to a threshold or when the signal obtained by weight multiplication can be demodulated successfully.

In the present embodiment, multiplier 402-1 performs at least one of phase control and amplitude control corresponding to power reception device 20A (in other words, a weight multiplication process) for a wireless signal. Detector 403-1 executes a carrier sense (hereinafter, referred to as a first carrier sense) using the result of the weight multiplication process. The first carrier sense is equivalent to the above-described carrier sense with a weight corresponding to the beam pattern of power reception device 20A.

A weight (at least one of phase information and amplitude information) corresponding to the second beam pattern is retained in memory unit 401-2. Weight information other than a weight corresponding to the second beam pattern may be retained in memory unit 401-2. The weight retained in memory unit 401-2 may be updated as needed.

Multiplier 402-2 performs a weight multiplication process using the weight corresponding to the second beam pattern and retained in memory unit 401-2. Multiplier 402-2 multiplies an input signal for the digital circuit 303 by a weight corresponding to the second beam pattern. In this configuration, multiplier 402-2 is allowed to obtain a signal equivalent to a wireless signal which is detected when a carrier sense is executed with a weight corresponding to the second beam pattern.

Detector 403-2 detects (determines) the presence or absence of a wireless signal based on the signal obtained by multiplier 402-2 (in other words, the signal obtained by weight multiplication). Specifically, detector 403-2 detects a wireless signal (in other words, determines the state as channel busy) when the energy of the signal obtained by weight multiplication is greater than or equal to a threshold or when the signal obtained by weight multiplication can be demodulated successfully.

In the present embodiment, multiplier 402-2 performs at least one of phase control and amplitude control corresponding to power reception device 20B (in other words, a weight multiplication process) for a wireless signal. Detector 403-2 executes a carrier sense (hereinafter, referred to as a second carrier sense) using the result of the weight multiplication process. The second carrier sense is equivalent to the above-described carrier sense with a weight corresponding to the second beam pattern.

According to the digital circuit 303 shown in FIG. 9, it is possible to simultaneously apply, to a wireless signal (input signal), the processes of multiplier 402-1 and detector 403-1 (in other words, the first carrier sense) in parallel with the processes of multiplier 402-2 and detector 403-2 (in other words, the second carrier sense).

Figure 10:
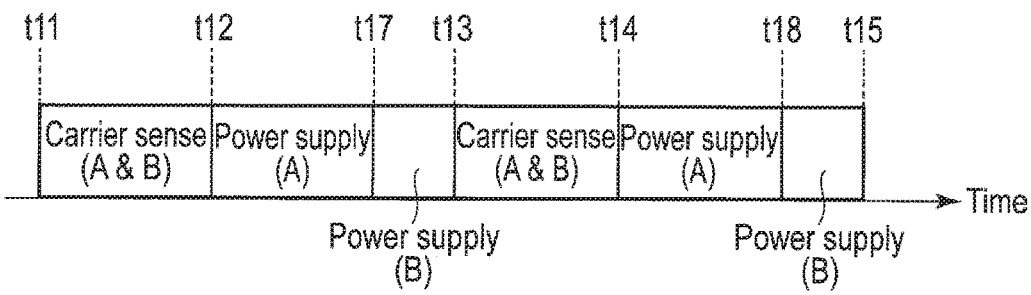
FIG. 10 is shown for explaining the outline of the operation of the wireless power supply device when power is supplied to a plurality of power reception devices with a digital circuit.

Now, this specification explains the outline of the operation of the wireless power supply device 10 when power is supplied to power reception devices 20A and 20B using the digital circuit 303 with reference to FIG. 10.

The signal detection module 101 starts carrier sense (A & B) at time t11. In FIG. 10, carrier sense (A & B) indicates that the first carrier sense is simultaneously performed in parallel with the second carrier sense by the signal detection module 101 (the digital circuit 303) including the configuration shown in FIG. 9.

When neither detection module 403-1 nor 403-2 detects a wireless signal in the above carrier sense period in carrier sense (A & B), carrier sense (A & B) is finished at time t12.

When carrier sense (A & B) is finished at time t12, the power supply module 102 starts power supply at time t12.

The power supply period (in other words, the maximum period in which power can be supplied) after carrier sense (A & B) is determined in advance, and is the period from time t12 to time t13. Thus, in the present embodiment, time division is applied to the power supply period such that the power supply period is divided into the period for supplying power to power reception device 20A and the period for supplying power to power reception device 20B (in other words, in the power supply period, the power supply to power reception device 20A is switched to the power supply to power reception device 20B).

Specifically, the period from time t12 to time t17 is allocated to the power supply to power reception device 20A, and the period from time t17 to time t13 is allocated to the power supply to power reception device 20B. In this case, power supply (A) is started with the beam pattern of power reception device 20A at time t12, and is finished at time t17. Subsequently, power supply (B) is started with the beam pattern of power reception device 20B at time t17, and is finished at time t13.

The time point (time t17) at which the power supply (beam pattern) is switched is determined based on, for example, a request power reception amount from power reception device 20A and a request power reception amount from power reception device 20B. For example, when the ratio of the request power reception amount from power reception device 20A to the request power reception amount from power reception device 20B is two to one, time t17 is determined such that the ratio of the period (from time t12 to time t17) allocated to the power supply to power reception device 20A to the period (from time t17 to time t13) allocated to the power supply to power reception device 20B is two to one.

When power supply (B) is finished at time t13, in the period from time t13 to time t15, carrier sense (A & B), power supply (A) and power supply (B) are performed in a manner similar to that of the period from time t11 to time t13. In this case, in the power supply period, the power supply to power reception device 20A is switched to the power supply to power reception device 20B at time t18.

In the present embodiment, the first carrier sense is executed in parallel with the second carrier sense in the same period. In the subsequent power supply period, time division is applied such that the power supply period is divided into the period for supplying power to power reception device 20A and the period for supplying power to power reception device 20B. In this way, power can be supplied in accordance with the request power reception amounts from power reception devices 20A and 20B while using the limited power supply period to the fullest extent.

In FIG. 10, power supply (B) is performed after power supply (A). However, for example, power supply (A) may be performed after power supply (B).

In FIG. 10, this specification explains a case where no wireless signal is detected in carrier sense (A & B). However, when a wireless signal is detected in one of the first and second carrier senses parallelly performed in carrier sense (A & B) (in other words, when a wireless signal is detected in one of detectors 403-1 and 403-2), the time division of power supply is not performed. For example, when a wireless signal is detected in the first carrier sense, and no wireless signal is detected in the second carrier sense, only power supply (B) should be performed in the power supply period after carrier sense (A & B). When no wireless signal is detected in the first carrier sense, and a wireless signal is detected in the second carrier sense, only power supply (A) should be performed in the power supply period after carrier sense (A & B).

In FIG. 10, this specification explains a case where power is supplied to each of power reception devices 20A and 20B. For example, when the power supply to one of power supply devices 20A and 20B is stopped (in other words, when it is unnecessary to supply power to one of them), similarly, the time division of power supply is not performed. In this case, the operation explained in FIG. 6 may be performed.

Further, in the above explanation of FIG. 10, time division is applied to power supply based on the ratio of the request power reception amount from power reception device 20A to the request power reception amount from power reception device 20B. However, for example, when the difference between the request power reception amount from power reception device 20A and the request power reception amount from power reception device 20B is less than or equal to a predetermined value, the time division of power supply may not be performed. Specifically, if the time division of power supply is performed when the difference between the request power reception amount from power reception device 20A and the request power reception amount from power reception device 20B is nearly zero, and the ratio between them is substantially one to one, the period of power supply (A) is substantially equal to the period of power supply (B). In this case, as the time efficiency of power supply is substantially the same as that of the case shown in FIG. 7, the time division of power supply may not be necessarily performed. Thus, when the difference between the request power reception amount from power reception device 20A and the request power reception amount from power reception device 20B is less than or equal to a predetermined value, the operation explained in FIG. 7 may be performed.

For example, when the difference between the request power reception amount from power reception device 20A and the request power reception amount from power reception device 20B is greater than or equal to a predetermined value, the time division of power supply may not be performed. Specifically, it is assumed that the difference between the request power reception amount from power reception device 20A and the request power reception amount from power reception device 20B is extremely large. For example, it is assumed that the ratio of the request power reception amount from power reception device 20A to the request power reception amount from power reception device 20B is 1 to 99. If the time division of power supply is performed in this case, the time point at which power supply (A) is switched to power supply (B) is immediately after the start of power supply (A). For example, if the time division of power supply is performed when the ratio of the request power reception amount from power reception device 20A to the request power reception amount from power reception device 20B is 99 to 1, the time point at which power supply (B) is finished is immediately after power supply (A) is switched to power supply (B). When one of the periods of power supply (A) and the period of power supply (B) is extremely short as described above, the effect of the period for switching the beam in the hardware of the wireless power supply device 10 (in other words, the time required for switching power supply) is dominant. Thus, it is difficult to obtain an effect by performing the time division of power supply. Therefore, when the difference between the request power reception amount from power reception device 20A and the request power reception amount from power reception device 20B is extremely large, the time division of power supply may not be performed.

For example, when the ratio of the request power reception amount from power reception device 20A to the request power reception amount from power reception device 20B is 1 to 99, power reception device 20B requires a large amount of power (energy) as an urgent case. The urgency of power supply to power reception device 20A is presumably low. In this case, in the power supply period, the time division of power supply is not performed. Only a carrier sense for power reception device 20B with high urgency may be performed. After this carrier sense, power may be supplied to power reception device 20B.

Further, for example, when the location of power reception device 20A is close to that of power reception device 20B, power may be supplied to both power reception device 20A and power reception device 20B with the same beam pattern (power supply beam). In this configuration, as it is unnecessary to switch the beam pattern, the efficiency of power supply may be improved. Thus, when the similarity between the beam pattern of power reception device 20A and the beam pattern of power reception device 20B is high, in other words, when the correlation value between them is greater than or equal to a threshold, the beam pattern may not be switched (in other words, the time division of power supply may not be performed), and power may be supplied to power reception devices 20A and 20B simultaneously only with one of the beam patterns (in other words, the beam pattern of power reception device 20A or 20B). The beam pattern of power reception device 20A and the beam pattern of power reception device 20B may be computed using the result of the estimation of a propagation channel using a beacon signal as described above, or may be computed using the location information, etc., indicated by power reception devices 20A and 20B.

Whether or not the beam pattern should be switched in the power supply period as described above (in other words, whether power should be supplied to both power reception device 20A and power reception device 20B by time division in the power supply period or power should be supplied to one of power reception devices 20A and 20B in the power supply period) may be determined based on, for example, the result of carrier sense, the number of power reception devices, request power reception amounts from the power reception devices (specifically, the ratio) or the correlation of beam patterns.

In FIG. 10, this specification explains that the switch between power supply (A) and power supply (B) is performed such that the period of power supply (A) is temporally continuous with the period of power supply (B). However, a predetermined interval may be provided between power supply (A) and power supply (B). Similarly, a predetermined interval may be provided between power supply (B) and the subsequent carrier sense (A & B).

Figure 11:
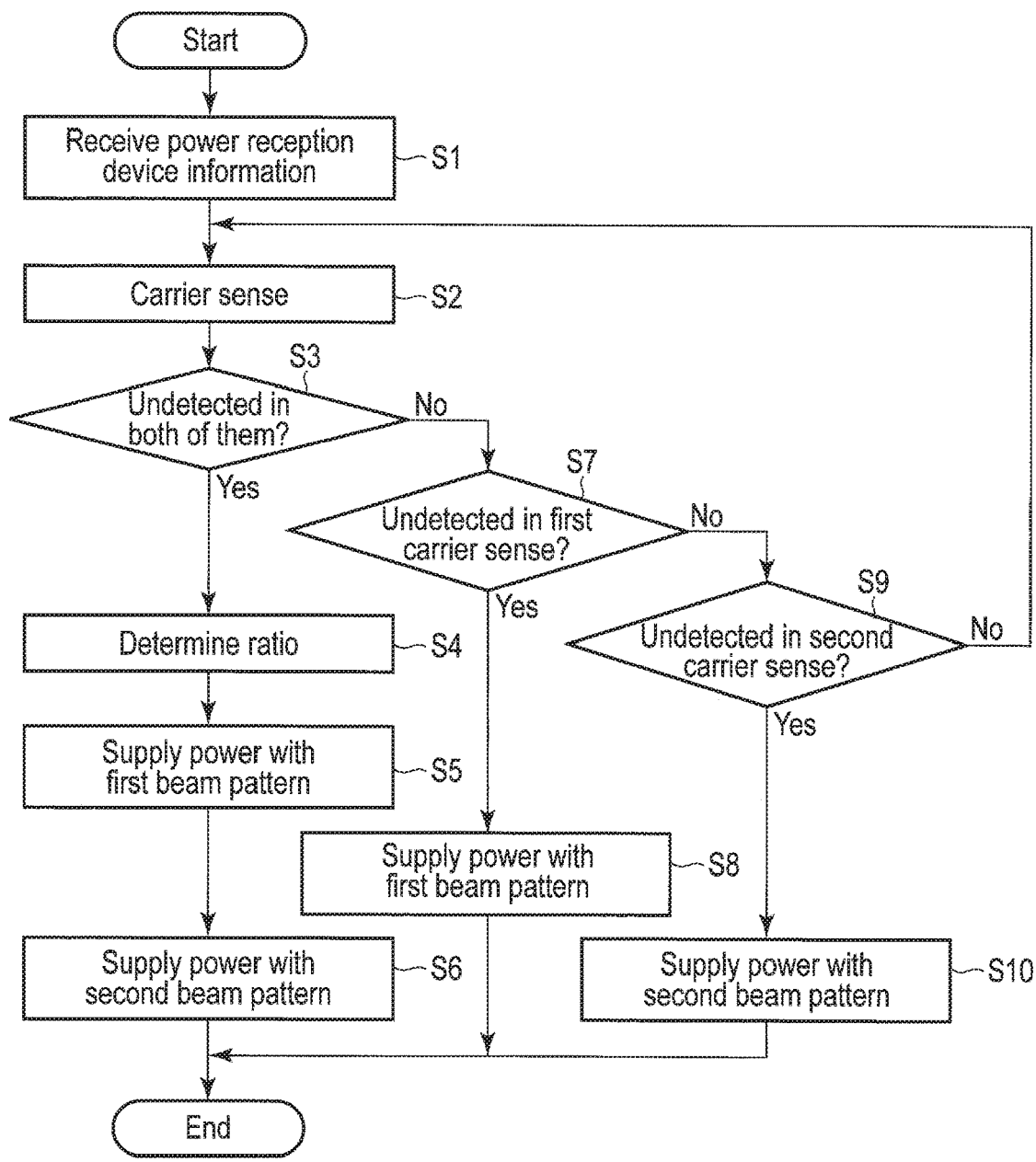
FIG. 11 is a flowchart showing an example of the processing procedure of the wireless power supply device.

Now, this specification explains an example of the processing procedure of the wireless power supply device 10 of the present embodiment with reference to the flowchart of FIG. 11.

The control module 103 receives the power reception device information of power reception devices 20A and 20B from power reception devices 20A and 20B, respectively (step S1). The power reception device information of power reception device 20A includes a request power reception amount from power reception device 20A. The power reception device information of power reception device 20B includes a request power reception amount from power reception device 20B. Whether the power reception device information received in step S1 is the power reception device information of power reception device 20A or the power reception device information of power reception device 20B can be identified by the power reception device ID included in the power reception device information.

Subsequently, the signal detection module 101 executes a carrier sense (step S2). In step S2, as described above, the first carrier sense is simultaneously executed in parallel with the second carrier sense. The first carrier sense is a carrier sense realized by performing at least one of phase control and amplitude control corresponding to power reception device 20A for a wireless signal in the digital circuit 303 as described above. The second carrier sense is a carrier sense realized by performing at least one of phase control and amplitude control corresponding to power reception device 20B for a wireless signal in the digital circuit 303 as described above.

The carrier sense executed in step S2 is equivalent to the carrier sense (A & B) shown in FIG. 10 described above. As this carrier sense is explained in FIG. 9 and FIG. 10, the detailed description thereof is omitted here.

After the process of step S2 is performed, whether or not a wireless signal is detected in neither the first carrier sense nor the second carrier sense (in other words, whether or not a wireless signal is undetected in both of them) is determined (step S3).

When it is determined that a wireless signal is detected in neither the first carrier sense nor the second carrier sense (YES in step S3), the power supply module 102 determines the ratio of the period for supplying power to power reception device 20A to the period for supplying power to power reception device 20B based on the request power reception amount included in the power reception device information of power reception device 20A (the request power reception amount from power reception device 20A) and the request power reception amount included in the power reception information of power reception device 20B (the request power reception amount from power reception device 20B) received in step S1 (step S4). In step S4, for example, the ratio of the request power reception amount from power reception device 20A to the request power reception amount from power reception device 20B is determined as the ratio of the period for supplying power to power reception device 20A to the period for supplying power to power reception device 20B.

Subsequently, the power supply module 102 supplies power to power reception device 20A with the first beam pattern in a period corresponding to the ratio of the period for supplying power to power reception device 20A determined in step S4 as described above in the predetermined power supply period (step S5). In step S5, power is supplied by exciting the antenna of each element of the phased array antenna based on a weight corresponding to the first beam pattern and forming a power supply beam for power reception device 20A as described above.

When the power supply in step S5 is finished, the power supply module 102 supplies power to power reception device 20B with the second beam pattern in the remaining power supply period (in other words, a period corresponding to the ratio of the period for supplying power to power reception device 20B determined in step S4) (step S6). In step S6, power is supplied by exciting the antenna of each element of the phased array antenna based on a weight corresponding to the beam pattern of power reception device 20B and forming a power supply beam for power reception device 20B as described above.

When it is determined that a wireless signal is detected in at least one of the first and second carrier senses in step S3 (NO in step S3), whether or not a wireless signal is undetected in the first carrier sense is determined (step S7).

When it is determined that a wireless signal is undetected in the first carrier sense (YES in step S7), the power supply module 102 supplies power to power reception device 20A with the first beam pattern in the predetermined power supply period (step S8). In this case, the above time division of power supply is not performed. It should be noted that the process of step S8 is the same as that of step S5 although the period for supplying power differs.

When it is determined that a wireless signal is detected in the first carrier sense (NO in step S7), whether or not a wireless signal is undetected in the second carrier sense is determined (step S9).

When it is determined that a wireless signal is undetected in the second carrier sense (YES in step S9), the power supply module 102 supplies power to power reception device 20B with the second beam pattern in the predetermined power supply period (step S10). In this case, the above time division of power supply is not performed. It should be noted that the process of step S10 is the same as that of step S6 although the period for supplying power differs.

When it is determined that a wireless signal is detected in the second carrier sense in step S9, in other words, when a wireless signal is detected in both the first carrier sense and the second carrier sense (NO in step S9), the process returns to step S2 for repetition as the first and second carrier senses are continued until the signal undetected period explained in FIG. 6 reaches the carrier sense period.

In FIG. 11, this specification explains a process performed when each of carrier sense and power supply is carried out once. However, the process (carrier sense and power supply) of FIG. 11 is repeated.

In FIG. 11, this specification explains that power reception device information is received in step S. However, power reception device information should be received at least before the process of step S4 is started. Thus, the time point at which power reception device information is received may be different from the explanation of FIG. 11.

In FIG. 11, this specification explains that the process of steps S4 to S6 is performed (in other words, power is supplied by time division) when a wireless signal is detected in neither the first carrier sense nor the second carrier sense. However, if the beam pattern is not switched in the power supply period as described above, even when a wireless signal is detected in neither the first carrier sense nor the second carrier sense, the process of step S8 or step S10 may be performed.

In the present embodiment, as described above, the first carrier sense is simultaneously executed in parallel with the second carrier sense. Now, this specification explains the details of the operation patterns of a case where a wireless signal is detected in only one of the first carrier sense and the second carrier sense. Here, first to third operation patterns are explained.

Figure 12:
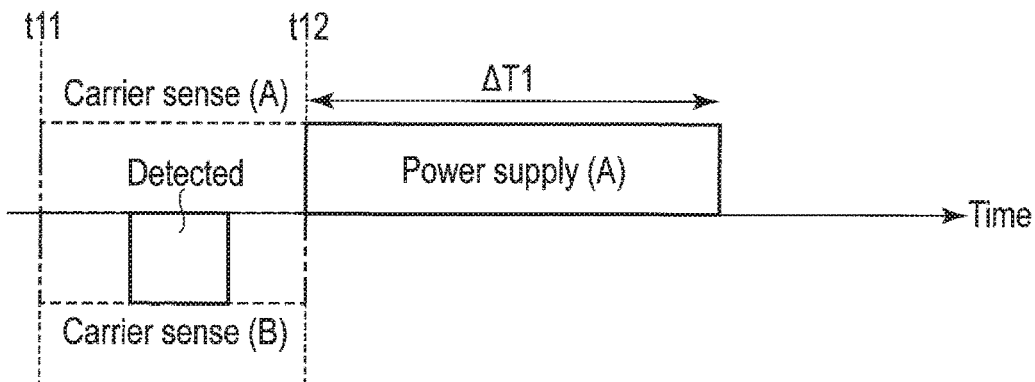
FIG. 12 shows the outline of a first operation pattern when a wireless signal is detected in only one of first and second carrier senses.

FIG. 12 shows the outline of the first operation pattern. In FIG. 12, for the sake of convenience, the first and second carrier senses parallelly executed in carrier sense (A & B) shown in FIG. 10 are separately indicated as carrier sense (A) and carrier sense (B), respectively. This notation is also applied to FIG. 13 and FIG. 14 explained later.

In the example shown in FIG. 12, no wireless signal is detected in the first carrier sense (A) although a wireless signal is detected in the second carrier sense (B). In the first operation pattern, at the time point when the first carrier sense (A) is finished (in other words, when the signal undetected period reaches the carrier sense period), the second carrier sense (B) is also finished, and power supply (A) to power reception device 20A is performed. In the first operation pattern, power supply (B) to power reception device 20B is not performed, and the period $\Delta T1$ shown in FIG. 12 is equivalent to the power supply period.

When power supply (A) is finished after the elapse of the power supply period (that is, period $\Delta T1$), the first carrier sense (A) is executed in parallel with the second carrier sense (B) again. In this case, the count of the signal undetected period in the second carrier sense (B) is reset.

The process shown in FIG. 11 described above is equivalent to the process of the wireless power supply device 10 when the wireless power supply device 10 operates based on the first operation pattern shown in FIG. 12.

Figure 13:
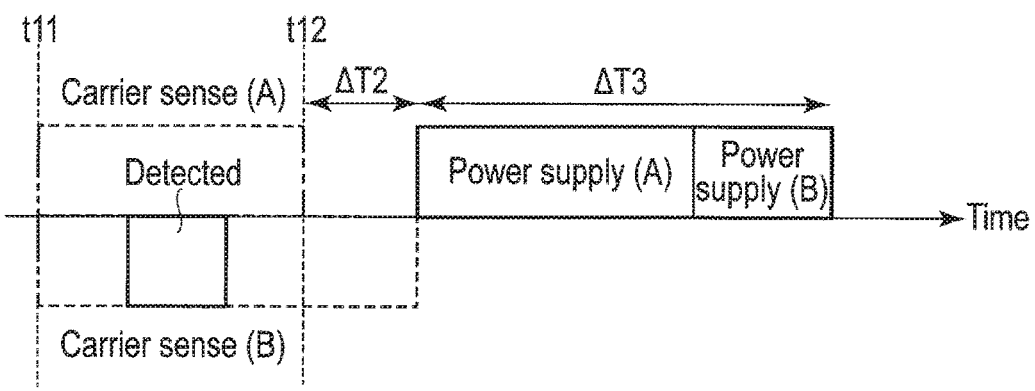
FIG. 13 shows the outline of a second operation pattern when a wireless signal is detected in only one of the first and second carrier senses.

FIG. 13 shows the outline of the second operation pattern. In the example shown in FIG. 13, in a manner similar to that of FIG. 12, no wireless signal is detected in the carrier sense period in the first carrier sense (A) although a wireless signal is detected in the second carrier sense (B). However, even when the first carrier sense (A) is finished, power supply (A) is not started (in other words, the second carrier sense (B) is extended) until the elapse of a predetermined period ΔT2 from the end of the first carrier sense (A).

Period ΔT2 (extended period) may be the difference between the signal undetected period and the carrier sense period in the second carrier sense (B) at the time point when the first carrier sense (A) is finished. However, another arbitrary period may be employed. In this case, when no signal is detected in the second carrier sense (B) in period ΔT2, the second carrier sense (B) is also finished. Thus, power supply (A) to power reception device 20A and power supply (B) to power reception device 20B can be performed by time division.

Period ΔT3 for performing power supply (A) and power supply (B) may be the same period as the predetermined power supply period or the period obtained by subtracting period ΔT2 from the power supply period (that is, ΔT3=ΔT1−ΔT2).

Figure 14:
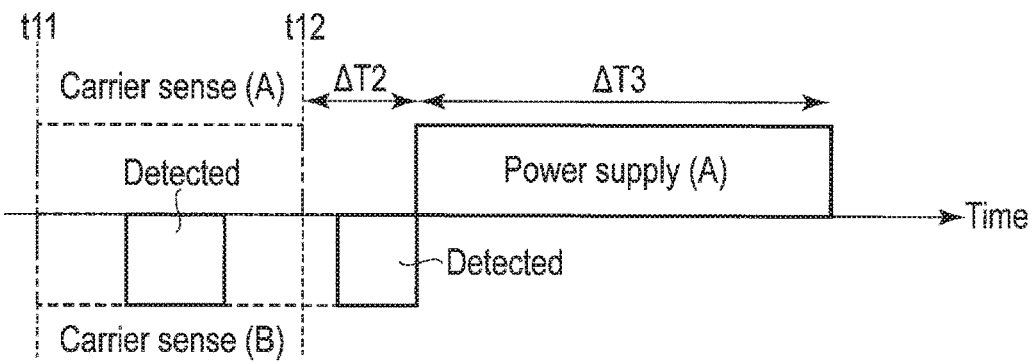
FIG. 14 shows the outline of a third operation pattern when a wireless signal is detected in only one of the first and second carrier senses.

FIG. 14 shows the outline of the third operation pattern. The third operation pattern assumes that a wireless signal is detected again in the second carrier sense (B) in period ΔT2 (extended period) in the second operation pattern shown in FIG. 13 described above.

In this case, at the time point when a wireless signal is detected again in the second carrier sense (B), power supply (A) to power reception device 20A is started. In the third operation pattern, power supply (B) to power reception device 20B is not performed.

Period ΔT3 for performing power supply (A) is the same as that of the second operation pattern described above.

In the present embodiment, when a wireless signal is detected in one of the first and second carrier senses, power can be appropriately supplied by operating the wireless power supply device 10 in accordance with at least one of the first to third operation patterns described above.

As described above, in the present embodiment, the first carrier sense realized by performing at least one of phase control and amplitude control corresponding to the first beam pattern for a wireless signal is executed in parallel with the second carrier sense realized by performing at least one of phase control and amplitude control corresponding to the second beam pattern for a wireless signal.

The first and second carrier senses executed parallelly are realized by multiplier 402-1 which multiplies a wireless signal by a weight (at least one of first phase information and first amplitude information) for forming the first beam pattern and multiplier 402-2 which multiplies a wireless signal by a weight (at least one of second phase information and second amplitude information) for forming the second beam pattern. The weight for forming the first beam pattern is computed (obtained) by receiving a beacon signal transmitted from power reception device 20A via the phased array antenna. The weight for forming the second beam pattern is computed (obtained) by receiving a beacon signal transmitted from power reception device 20B via the phased array antenna.

In this way, in the present embodiment, power can be supplied to power reception device 20A with the first beam pattern based on the result of the first carrier sense, and power can be supplied to power reception device 20B with the second beam pattern based on the result of the second carrier sense. In this case, power is supplied with the first beam pattern in a first period of the power supply period, and power is supplied with the second beam pattern in a second period of the power supply period.

In the present embodiment, this configuration allows the first carrier sense to be simultaneously executed in parallel with the second carrier sense with weights corresponding to different beam patterns, and further enables power supply by time division to both power reception device 20A and power reception device 20B in the power supply period after the first and second carrier senses. Thus, power can be effectively supplied to power reception devices 20A and 20B in the limited power supply period.

Moreover, the present embodiment allows the suppression of interference with an existing wireless communication system as power is not supplied depending on the result of the first and second carrier senses.

The present embodiment determines whether power should be supplied to both power reception device 20A and power reception device 20B by time division in the power supply period or power should be supplied to one of power reception devices 20A and 20B based on request power reception amounts from power reception devices 20A and 20B. When power is supplied to both power reception device 20A and power reception device 20B by time division, the ratio of the first period (the period for supplying power to power reception device 20A) to the second period (the period for supplying power to power reception device 20B) is determined based on request power reception amounts from power reception devices 20A and 20B. In the present embodiment, this configuration enables the flexible control of the period for supplying power to power reception devices 20A and 20B based on request power reception amounts from power reception devices 20A and 20B.

In the present embodiment, this specification explains that the request power reception amounts included in the power reception device information (the first and second power reception device information) of power reception devices 20A and 20B are used to determine the ratio of the period for supplying power to each of power reception devices 20A and 20B. However, information other than the request power reception amounts may be used. For example, the remaining amount (battery information) of the battery provided in each of power reception devices 20A and 20B may be included in the power reception device information of the power reception device. The ratio of the period for supplying power to each of power reception devices 20A and 20B may be determined based on the battery information of power reception devices 20A and 20B. The energy level when power was received in each of power reception devices 20A and 20B (the energy level received in the past, the energy level currently received in progress, etc.,) may be included in the power reception device information of the power reception device. The ratio of the period for supplying power to each of power reception devices 20A and 20B may be determined based on the energy levels (hereinafter, referred to as power reception energy) in power reception devices 20A and 20B. The ratio of the period for supplying power to each of power reception devices 20A and 20B may be determined based on the combination of request power reception amounts, battery information and power reception energy from power reception devices 20A and 20B, or may be determined based on the result obtained by statistically analyzing this information (the maximum value, the minimum value, the mean value, the median, the distributed value, the standard deviation, etc.). According to this configuration, the priority of power supply to power reception devices 20A and 20B can be determined, and the power supply (in other words, beam pattern) can be switched at an appropriate time point between reception devices 20A and 20B.

As described above, in the present embodiment, carrier senses (the first and second carrier senses) corresponding to a plurality of beam patterns are parallelly processed in the digital circuit 303. Time division is applied to the power supply period subsequent to the carrier senses based on the power reception device information (for example, request power reception amounts) from power reception devices 20A and 20B. In this way, it is possible to realize power supply satisfying the requests from power reception devices 20A and 20B within the restrictions on the power supply period.

In the present embodiment, this specification explains the configuration for realizing a weight multiplication process (in other words, a process for multiplying a signal by a weight corresponding to each beam pattern) in the first and second carrier senses in the digital circuit 303. However, an analog circuit may be also used. In this case, for example, the signal detection module 101 includes an analog phase shifter between the antenna 14 and the analog-to-digital converter 302. The signal detection module 101 may include one of more amplifiers in addition to the analog phase shifter. As described above, in the present embodiment, power supply by time division may not be performed in the power supply period. In this case, the above weight multiplication process may be replaced by phase conversion in the analog phase shifter (and an amplification process in the amplifier) instead of the digital circuit 303 (multipliers 402-1 and 402-2). In the case of this configuration, the weight multiplication process in multipliers 402-1 and 402-2 of the digital circuit 303 is unnecessary. Signal detection can be performed only by detectors 403-1 and 403-2.

An energy detector may be provided in the stage before the analog-to-digital converter 302 such that signal detection is conducted in the energy detector. In this configuration, for example, when power supply by time division is not performed, the digital circuit 303 can be turned off. Thus, this configuration can contribute to the reduction in energy consumption in the wireless power supply device 10.

In the present embodiment, the digital circuit 303 is provided to simultaneously execute the first carrier sense in parallel with the second carrier sense. However, when the above-described analog phase shifter, amplifier and energy detector are provided for each of power reception devices 20A and 20B (in other words, each beam pattern), it is possible to realize the wireless power supply device 10 in which the first carrier sense is simultaneously executed in parallel with the second carrier sense in the analog circuit without using the digital circuit 303.

Second Embodiment

This specification explains a second embodiment. In the present embodiment, the same portions as the drawings used in the explanation of the first embodiment are denoted by the same reference numbers. Portions different from those of the first embodiment are mainly explained below.

Figure 15:
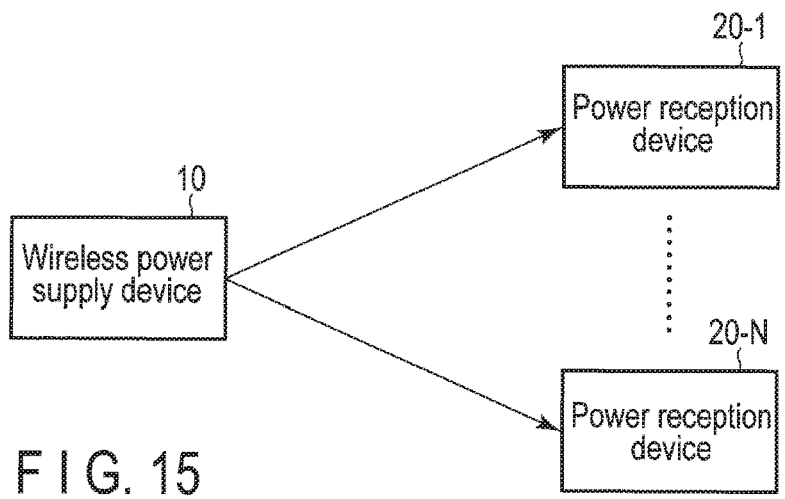
FIG. 15 shows the correspondence relationship between a wireless power supply device and power reception devices according to a second embodiment.

FIG. 15 shows the correspondence relationship between a wireless power supply device and power reception devices according to the present embodiment. In the first embodiment, this specification mainly explains a case where the wireless power supply device 10 supplies power to two power reception devices 20A and 20B. The present embodiment assumes that a wireless power supply device 10 supplies power to power reception devices 20-1 to 20-N, where N is a natural number.

In this case, the wireless power supply device 10 of the present embodiment needs to form a power supply beam with a beam pattern corresponding to each of power reception devices 20-1 to 20-N to supply power.

Figure 16:
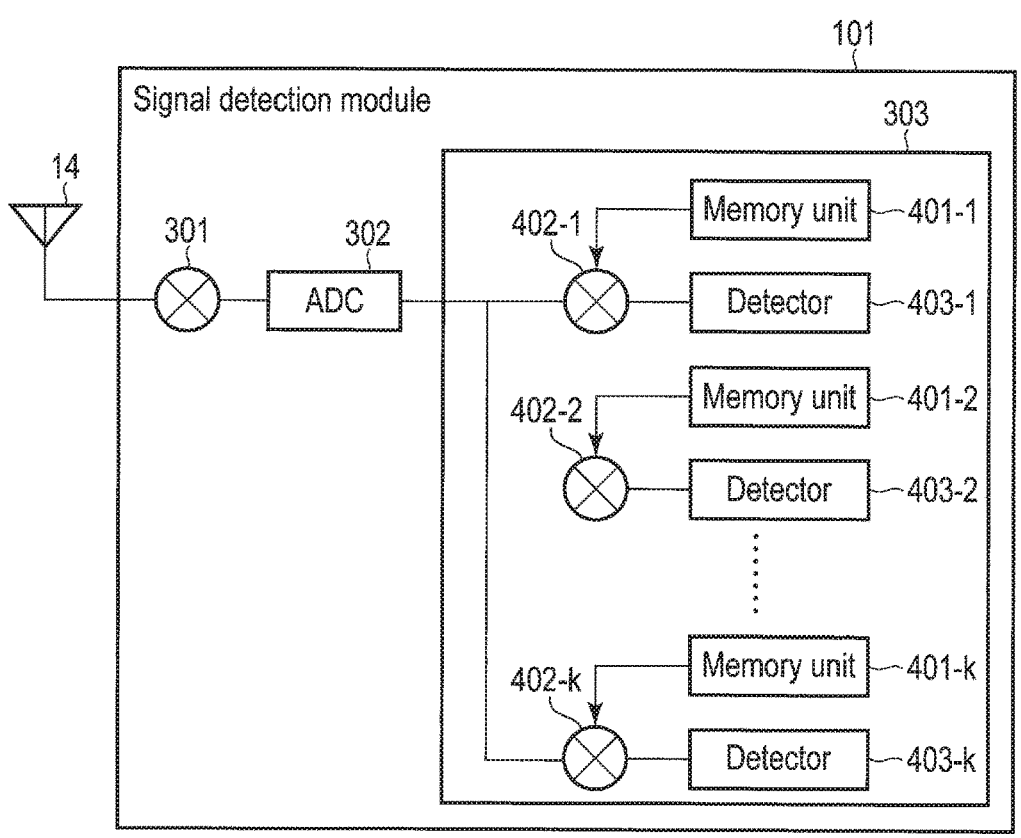
FIG. 16 shows an example of the configuration of another signal detection module.

FIG. 16 shows an example of the configuration of a signal detection module 101 included in the wireless power supply device 10 according to the present embodiment.

In a manner similar to that of the first embodiment explained above, the signal detection module 101 includes a mixer 301, an analog-to-digital converter (ADC) 302 and a digital circuit 303. In the present embodiment, the digital circuit 303 includes memory units 401-1 to 401-$k$, multipliers 402-1 to 402-$k$ and detectors 403-1 to 403-$k$.

In the first embodiment explained above, the digital circuit 303 includes two memory units, two multipliers and two detectors. In the present embodiment, the digital circuit 303 includes k memory units, k multipliers and k detectors, where k is a natural number. In this respect, the digital circuit 303 of the present embodiment is different from that of the first embodiment.

In the present embodiment, as the digital circuit 303 includes the above structure, it is possible to simultaneously and parallelly execute carrier senses (specifically, first to k-th carrier senses) with weights corresponding to the beam patterns of up to k power reception devices.

In the first embodiment explained above, the number of power reception devices (in other words, the number of beam patterns) is the same as the number of memory units, the number of multipliers and the number of detectors. However, in the present embodiment, the number (here, N) of power reception devices is not necessarily equal to the number (here, k) of memory units, the number (k) of multipliers or the number (k) of detectors.

In this case, for example, the correspondence relationship between multipliers 402-1 to 402-$k$ and power reception devices 20-1 to 20-N is not one to one (in other words, for example, to which beam pattern of power reception devices 20-1 to 20-N multiplier 402-1 performs a process for multiplying a signal by a weight corresponding is not determined). Thus, weights corresponding to all the beam patterns of power reception devices 20-1 to 20-N are retained in each of memory units 401-1 to 401-$k$. According to this configuration, each of multipliers 402-1 to 402-$k$ is allowed to perform a weight multiplication process using a weight corresponding to the beam pattern of a power reception device allocated to the multiplier.

Alternatively, apart from memory units 401-1 to 401-$k$, a common memory unit may be provided. Weights corresponding to all the beam patterns of power reception devices 20-1 to 20-N may be retained in the common memory unit. In this case, a weight corresponding to the beam pattern of a power reception device allocated to each of multipliers 402-1 to 402-$k$ may be copied from the common memory unit to a corresponding memory unit and retained in the memory unit.

Now, this specification explains the operation of the wireless power supply device 10 of the present embodiment. In the present embodiment, the operation (process) differs between, as described above, a case where N is less than or equal to k and a case where N is greater than k, where N is the number of power reception devices, and k is the number of memory units, the number of multipliers and the number of detectors.

Figure 17:
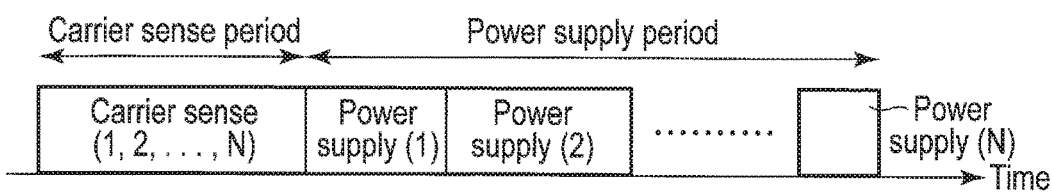
FIG. 17 is shown for explaining an example of the operation of the wireless power supply device when N is less than or equal to k.

This specification explains an example of the operation of the wireless power supply device 10 when N is less than or equal to k with reference to FIG. 17. In this case, since N is less than or equal to k, carrier senses (the first to N-th carrier senses) with weights corresponding to the beam patterns of all power reception devices 20-1 to 20-N are simultaneously and parallelly executed. In this case, the operation of the wireless power supply device 10 is the same as that of the first embodiment explained above excluding the difference in the number of carrier senses simultaneously and parallelly executed.

Specifically, power reception devices 20-1 to 20-N (in other words, weights corresponding to their beam patterns) are allocated to N multipliers (for example, multipliers 402-1 to 402-N) of k multipliers 402-1 to 402-$k$ included in the digital circuit 303. In this way, in the digital circuit 303, weight multiplication processes (weight calculation) corresponding to the beam patterns of N power reception devices 20-1 to 20-N, respectively, are parallelly performed in N multipliers 402-1 to 402-N, and the first to N-th carrier senses are executed. When no wireless signal is detected in the first to N-th carrier senses, power is supplied by time division to each of power reception devices 20-1 to 20-N while switching the beam pattern in the power supply period.

In this case, the ratio of the period for supplying power to each of power reception devices 20-1 to 20-N may be determined based on request power reception amounts from the power reception devices as explained in the first embodiment.

Now, this specification explains an example of the operation of the wireless power supply device 10 when N is greater than k with reference to FIG. 18. In this case, in a manner different from that of the above case where N is less than or equal to k, it is not possible to simultaneously or parallelly execute carrier senses (the first to N-th carrier senses) with weights corresponding to the beam patterns of all the power reception devices 20-1 to 20-N. Therefore, from N power reception devices 20-1 to 20-N, k power reception devices (for example, power reception devices 20-1 to 20-$k$) are selected. After k power reception devices 20-1 to 20-$k$ are selected, the wireless power supply device 10 operates in a manner similar to that of the above case where N is less than or equal to k, and simultaneously and parallelly executes carrier senses (the first to k-th carrier senses) with weights corresponding to the beam patterns of power reception devices 20-1 to 20-$k$, respectively.

Specifically, the selected power reception devices 20-1 to 20-$k$ (in other words, weights corresponding to their beam patterns) are allocated to k multipliers 402-1 to 402-$k$ included in the digital circuit 303. In this way, in the digital circuit 303, weight multiplication processes (weight calculation) corresponding to the beam patterns of k power reception devices 20-1 to 20-$k$, respectively, are parallelly performed in k multipliers 402-1 to 402-$k$, and the first to k-th carrier senses are executed. When no wireless signal is detected in the first to k-th carrier senses, power is supplied by time division to each of power reception devices 20-1 to 20-$k$ while switching the beam pattern in the power supply period.

In this case, the ratio of the period for supplying power to each of power reception devices 20-1 to 20-$k$ may be determined based on request power reception amounts from the power reception devices.

Here, power is supplied to power reception devices 20-1 to 20-$k$ of N power reception devices 20-1 to 20-N. However, power is not supplied to the remaining power reception devices 20-$k$+1 to 20-N.

As shown in FIG. 18, when power supply to power reception devices 20-1 to 20-$k$ is finished, to supply power to power reception devices 20-$k$+1 to 20-N, carrier senses (the k+1-th to N-th carrier senses) with weights corresponding to the beam patterns of power reception devices 20-$k$+1 to 20-N are simultaneously and parallelly executed.

Specifically, power reception devices 20-$k$+1 to 20-N (in other words, weights corresponding to their beam patterns) are allocated to N-k multipliers (for example, multipliers 402-1 to 402-N-k) of k multipliers 402-1 to 402-$k$ included in the digital circuit 303. In this way, in the digital circuit 303, weight multiplication processes (weight calculation) corresponding to the beam patterns of N-k power reception devices 20-$k$+1 to 20-N, respectively, are parallelly performed in N-k multipliers 402-1 to 402-N-k, and the k+1-th to N-th carrier senses are executed. When no wireless signal is detected in the k+1-th to N-th carrier senses, power is supplied by time division to each of power reception devices 20-$k$+1 to 20-N while switching the beam pattern in the power supply period.

In this case, the ratio of the period for supplying power to each of power reception devices 20-$k$+1 to 20-N may be determined based on request power reception amounts from the power reception devices.

FIG. 18 assumes that the number of power reception devices 20-$k$+1 to 20-N is less than the number of multipliers 402-1 to 402-$k$. However, when the number of power reception devices 20-$k$+1 to 20-N is greater than the number of multipliers 402-1 to 402-$k$, the above operation should be repeated in the same manner.

When N is greater than k as described above, k power reception devices (for example, power reception devices 20-1 to 20-$k$) are selected, and power supply to power reception devices 20-1 to 20-$k$ is performed separately from power supply to power reception devices 20-$k$+1 to 20-N. The k power reception devices to be selected may be determined in a random manner. Alternatively, for example, the k power reception devices to be selected may be determined based on request power reception amounts from power reception devices 20-1 to 20-N. Specifically, for example, k power reception devices may be determined in descending order in terms of the request power reception amount. For example, k power reception devices may be determined by categorizing power reception devices 20-1 to 20-N such that the variation in the request power reception amount is in a certain range. When k power reception devices are determined such that the variation in the request power reception amount is in a certain range, as explained in the first embodiment, it is possible to avoid failing to obtain the effect of time division of power supply because the difference in the request power reception amount is extremely large.

In the above explanation, k power reception devices are determined (selected) using a request power reception amount. However, k power reception devices may be determined based on, for example, a request power reception amount, battery information or power reception energy explained in the first embodiment, a combination thereof, or the result obtained by statistically analyzing this information (the maximum value, the minimum value, the mean value, the median, the distributed value, the standard deviation, etc.).

In the present embodiment, even when the number of power reception devices 20-1 to 20-N is greater than the number of multipliers 402-1 to 402-$k$ (and the number of detectors 403-1 to 403-$k$), it is possible to realize power supply satisfying a request from each of power reception devices 20-1 to 20-N within the restrictions on the digital circuit and the restrictions on the power supply period by operating the wireless power supply device 10 as shown in FIG. 18.

The above FIG. 17 and FIG. 18 assume that no wireless signal is detected in carrier senses parallelly executed. However, when a wireless signal is detected in at least one of carrier senses parallelly executed, the wireless power supply device 10 should operate in accordance with at least one of the first to third operation patterns explained in the first embodiment.

Figure 19:
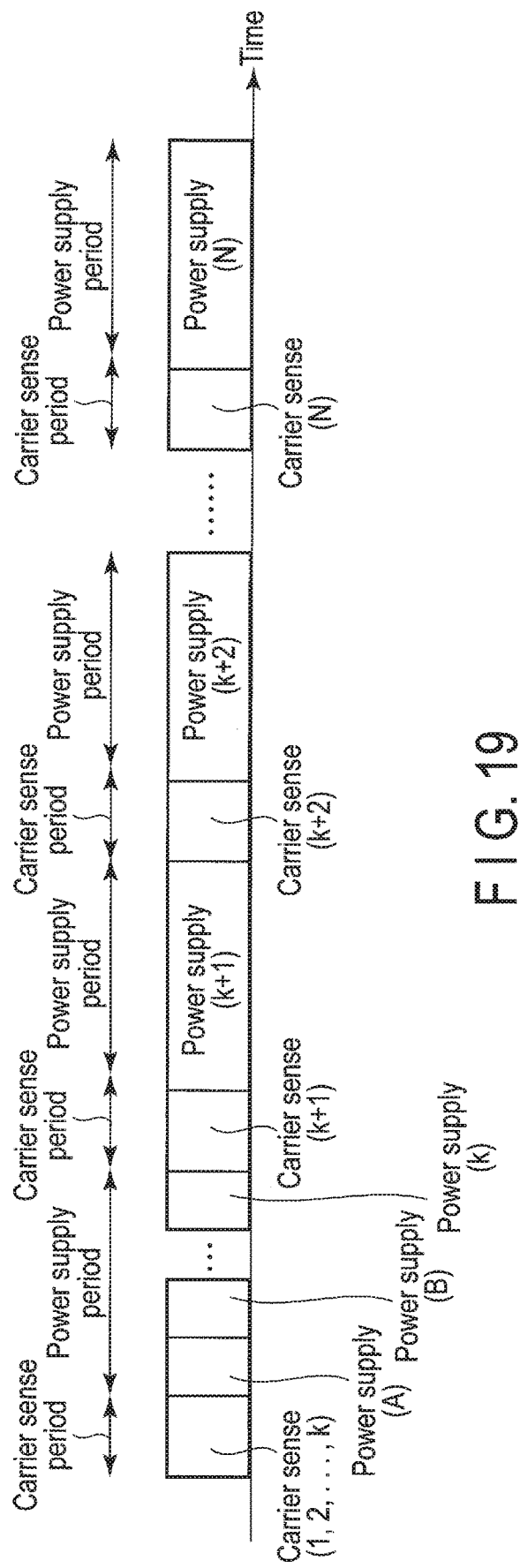
FIG. 19 is shown for explaining another example of the operation of the wireless power supply device when N is greater than k.

In FIG. 18, the wireless power supply device 10 operates so as to perform carrier senses and power supply by separating power reception devices 20-1 to 20-N into power reception devices 20-1 to 20-$k$ and power reception devices 20-$k$+1 to 20-N. However, for example, as shown in FIG. 19, the first to k-th carrier senses may be executed, and subsequently, power may be supplied to each of power reception devices 20-1 to 20-$k$ by time division. For the remaining power reception devices 20-$k$+1 to 20-N, a carrier sense and power supply may be (sequentially) performed in series.

In FIG. 18 and FIG. 19, this specification explains that the first to k-th carrier senses are firstly executed. However, for example, even when N is greater than k, the first to k-th carrier senses (in other words, carrier senses for k power reception devices) are not necessarily firstly executed. For example, carrier senses and power supply may be performed by separating power reception devices 20-1 to 20-N into groups each including N/2 power reception devices.

For example, when N power reception devices 20-1 to 20-N include a power reception device having an extremely great request power reception amount, a carrier sense and power supply may be firstly performed for only the power reception device. Subsequently, carrier senses may be executed parallelly for the other power reception devices, and power may be supplied to each of the other power reception devices by time division.

Further, it is assumed that power is supplied to N power reception devices 20-1 to 20-N (or k power reception devices 20-1 to 20-$k$) by time division. In this case, for example, when the similarity is high in the beam patterns of some of N power reception devices 20-1 to 20-N (in other words, when the installation places of some power reception devices are very close to each other, and the correlation value of the beam patterns is greater than or equal to a threshold), power may be supplied to these power reception devices with a common beam pattern.

The number of carrier senses parallelly executed and the number of periods obtained by the time division of the power supply period may be determined (adjusted) based on, for example, the result of a carrier sense, the number of power reception devices, the power reception device information (request power reception amount, battery information or power reception energy) of each power reception device or the correlation of beam patterns, or may be determined based on a combination thereof or the result of statistical analysis.

In the present embodiment, this specification explains that the ratio of the period for supplying power to each of power reception devices 20-1 to 20-N (in other words, the time point at which the beam pattern is switched) is determined based on request power reception amounts. However, as explained in the first embodiment, the ratio may be determined based on request power reception amounts, battery information, power reception energy, a combination thereof, or the result obtained by statistically analyzing this information (the maximum value, the minimum value, the mean value, the median, the distributed value, the standard deviation etc.). In this way, the priority of power supply to power reception devices 20-1 to 20-N can be determined, and the power supply (that is, the beam pattern) can be switched at an appropriate time point for power reception devices 20-1 to 20-N.

As described above, the present embodiment includes the digital circuit 303 configured to parallelly execute the first to k-th carrier senses with weights corresponding to k beam patterns. Thus, power can be supplied to power reception devices 20-1 to 20-N while appropriately switching the processing between carrier senses parallelly executed (parallel processing) and carrier senses executed in series (sequential processing) based on various conditions.

According to this configuration, it is possible to realize power supply satisfying a request from each power reception device within the restrictions on the computing scale of the digital circuit and the restrictions on the power supply period even when, for example, the number of power reception devices is increased.

At least one of the above embodiments can provide an electronic device and a method capable of effectively supplying power.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   processor circuitry configured to:
   control a detection module to execute a first carrier sense by performing at least one of phase control and amplitude control corresponding to a first beam pattern for a received wireless signal, and execute a second carrier sense by performing at least one of phase control and amplitude control corresponding to a second beam pattern for the received wireless signal; and
   control a power supply module to supply power by an electromagnetic wave with the first beam pattern based on a result of the first carrier sense, and supply power by an electromagnetic wave with the second beam pattern based on a result of the second carrier sense.

2. The electronic device of claim 1, wherein the processor circuitry is configured to:

control the detection module to execute the first carrier sense based on a first wireless signal obtained by multiplying the received wireless signal by at least one of first phase information and first amplitude information for forming the first beam pattern, and control the detection module to execute the second carrier sense based on a second wireless signal obtained by multiplying the received wireless signal by at least one of second phase information and second amplitude information for forming the second beam pattern.

3. The electronic device of claim 2, further comprising a phased array antenna, wherein:

at least one of the first phase information and the first amplitude information is obtained by receiving, via the phased array antenna, a beacon signal transmitted from a first power reception device to which power is supplied with the first beam pattern, and at least one of the second phase information and the second amplitude information is obtained by receiving, via the phased array antenna, a beacon signal transmitted from a second power reception device to which power is supplied with the second beam pattern.

4. The electronic device of claim 1, wherein the processor circuitry is configured to control the power supply module to determine whether power should be supplied with the first beam pattern or the second beam pattern based on first information related to a first power reception device to which power is supplied with the first beam pattern and second information related to a second power reception device to which power is supplied with the second beam pattern.

5. The electronic device of claim 4, wherein:

the first information includes at least one of a power reception amount requested by the first power reception device, a remaining amount of a battery provided in the first power reception device, and an energy level when power is received in the first power reception device, and the second information includes at least one of a power reception amount requested by the second power reception device, a remaining amount of a battery provided in the second reception device, and an energy level when power is received in the second power reception device.

6. The electronic device of claim 1, wherein:

the processor circuitry is configured to control the power supply module to supply power with the first beam pattern in a first period of a power supply period allocated to the power supply module, and supply power with the second beam pattern in a second period of the power supply period, and a ratio between the first period and the second period is determined based on first information related to a first power reception device to which power is supplied with the first beam pattern and second information related to a second power reception device to which power is supplied with the second beam pattern.

7. An electronic device which supplies power to first to N-th power reception devices by an electromagnetic wave, where N is a natural number, the electronic device comprising:

processor circuitry configured to:

control a detection module to execute first to k-th carrier senses by performing at least one of phase control and amplitude control corresponding to first to k-th beam patterns, respectively, for a received wireless signal, where k is a natural number less than N; and control a power supply module to supply power to the first to k-th power reception devices by an electromagnetic wave with the first to k-th beam patterns based on results of the first to k-th carrier senses, respectively, wherein the first to k-th power reception devices to which power is supplied are determined based on first to N-th information related to the first to N-th power reception devices, respectively.

8. The electronic device of claim 7, wherein:

the processor circuitry is configured to control the power supply module to supply power with the first to k-th beam patterns in first to k-th periods of a first power supply period allocated to the power supply module, and each of the first to k-th periods is determined based on the first to N-th information.

9. The electronic device of claim 8, wherein the processor circuitry is configured to:

control the detection module to execute k+1-th to N-th carrier senses by performing at least one of phase control and amplitude control corresponding to k+1-th to N-th beam patterns for the received wireless signal in a second carrier sense period different from a first carrier sense period for executing the first to k-th carrier senses, and control the power supply module to supply power with the k+1-th to N-th beam patterns to the k+1-th to N-th power reception devices based on results of the k+1-th to N-th carrier senses, respectively, in a second power supply period different from the first power supply period.

10. The electronic device of claim 8, wherein the processor circuitry is configured to:

control the detection module to execute k+1-th to N-th carrier senses in series by performing at least one of phase control and amplitude control corresponding to k+1-th to N-th beam patterns, respectively, for the received wireless signal in a plurality of second carrier sense periods different from a first carrier sense period for executing the first to k-th carrier senses, and control the power supply module to supply power with the k+1-th to N-th beam patterns to k+1-th to N-th power reception devices based on results of the k+1-th to N-th carrier senses in a plurality of second power supply periods different from the first power supply period.

11. An electronic device comprising processor circuitry configured to control a power reception module to receive, after executing both (i) a first carrier sense by performing at least one of phase control and amplitude control corresponding to a first beam pattern for a wireless signal received in a transmission source of an electromagnetic wave and (ii) a second carrier sense by performing at least one of phase control and amplitude control corresponding to a second beam pattern for the received wireless signal, at least one of power transmitted by an electromagnetic wave with the first beam pattern based on a result of the first carrier sense and power transmitted by an electromagnetic wave with the second beam pattern based on a result of the second carrier sense.

12. The electronic device of claim 11, further comprising a power storage configured to store at least a part of the received power.

13. A method comprising:
- executing a first carrier sense by performing at least one of phase control and amplitude control corresponding to a first beam pattern for a received wireless signal, and a second carrier sense by performing at least one of phase control and amplitude control corresponding to a second beam pattern for the received wireless signal;
- supplying power with the first beam pattern by an electromagnetic wave based on a result of the first carrier sense; and
- supplying power with the second beam pattern by an electromagnetic wave based on a result of the second carrier sense.

\* \* \* \* \*